United States Patent Office 3,575,996
Patented Apr. 20, 1971

3,575,996
NEW BISAZOLES
Peter Liechti, Binningen, Leonardo Guglielmetti, Birsfelden, Erwin Maeder, Aesch, Basel-Land, and Adolf Emil Siegrist, Basel-Land, Switzerland, assignors to Ciba Limited, Basel, Switzerland
No Drawing. Continuation-in-part of abandoned application Ser. No. 482,275, Aug. 24, 1965. This application Mar. 1, 1966, Ser. No. 530,800
Claims priority, application Switzerland, Sept. 1, 1964, 11,402
Int. Cl. C07d 85/48
U.S. Cl. 260—307
8 Claims

ABSTRACT OF THE DISCLOSURE

This invention concerns new optical brighteners of the formula

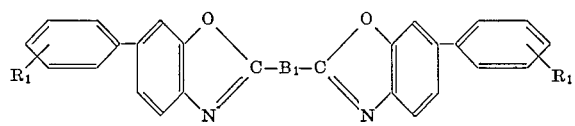

wherein $R_1$ is hydrogen or alkyl and $B_1$ stands for a direct carbon-to-carbon bond, or a possibly substituted phenylene or biphenylene group, as well as organic fiber materials optically brightened therewith.

---

This is a continuation-in-part of our copending patent application Ser. No. 482,275, filed Aug. 24, 1965, and now abandoned.

This invention provides valuable new bisazoles of the general Formula 1

(1)
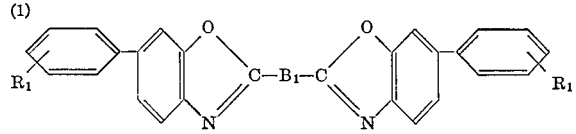

where each of the residues $R_1$ represents a member selected from the group consisting of a hydrogen atom and an alkyl group containing 1 to 6 carbon atoms, and $B_1$ represents a bivalent bridge member selected from the group consisting of the formula

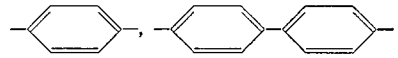

and a direct bond between the $C_2$ carbon atoms of the benzoxazolyl nuclei, and the phenylene nuclei of the said bridge members may contain as substituents members selected from the group consisting of 1 to 2 lower alkyl groups containing 1 to 4 carbon atoms and 1 to 4 halogen atoms.

Of special value among these new bisazoles of the Formula 1 are the bisbenzoxazoles of the Formula 2

(2)
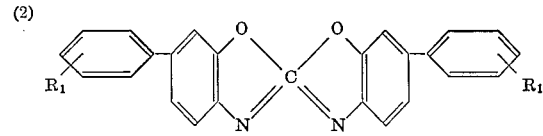

wherein $R_1$ has the significance as given for Formula 1 and the phenylene residue linking the benzoxazolyl nuclei by the C–2 carbon atoms of the latter may contain as substituents members selected from the group consisting of 1 to 2 lower alkyl groups containing 1 to 4 carbon atoms, preferably methyl groups, and 1 to 4 halogen atoms.

A group of relevant compounds of specific value may be represented by the Formula 3

(3)
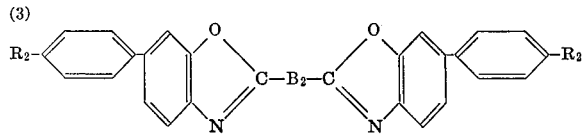

where the residues $R_2$ are identical and each represents a member selected from the group consisting of a hydrogen atom, a methyl and a tertiary butyl group, and $B_2$ stands for a 1,4-phenylene residue, said phenylene residue containing up to 2 members selected from the group consisting of a halogen atom and a methyl group.

The new bisazoles of the Formula 1 can be manufactured by various known methods, for example by reacting a dicarboxylic acid derivative of the formula (4)

(where R stands for a hydroxyl group or a halogen, especially chlorine, atom and B has the above meaning) with an ortho-amino compound of the formula (5)
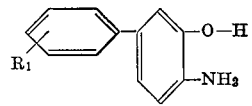

(where $R_1$ has the above meaning) according to the following scheme of reactions

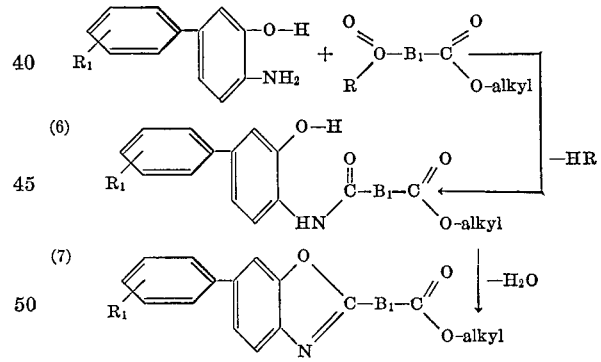

whereupon the alkyl ester group of azole compound 7 is hydrolyzed to the carboxyl group which, if desired, is converted into a carboxylic acid halide group, especially a carboxylic acid chloride group, and the compound thus obtained, which corresponds to the formula (8)
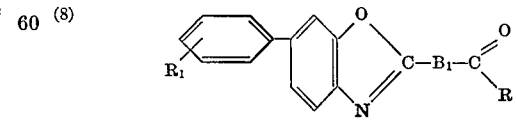

(where R has the same meaning as in Formula 4) is reacted with an ortho-amino compound of the formula (9)
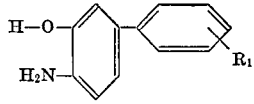

(where $R_1$ has the above meaning) according to the following scheme of reactions (10)

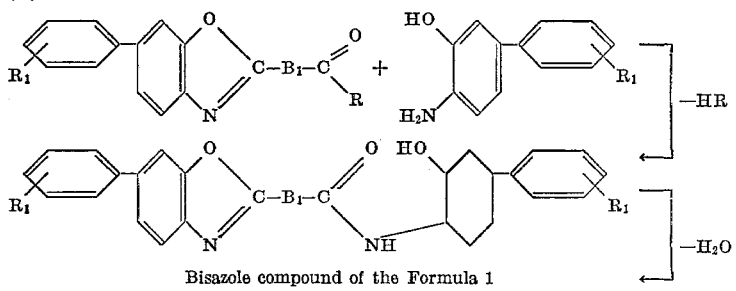

Bisazole compound of the Formula 1

Bisoxazoles of the Formula 1 wherein the substituents $R_1$ are identical can be prepared, for example, by reacting in the molecular ratio of 1:2 a compound of the formula (11)

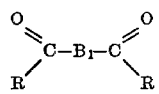

(where $B_1$ has the same meaning as in the Formula 1) and R stands for a hydroxyl group or a halogen, especially chlorine, atom) with an ortho-amino compound of the formula (12)

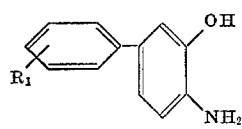

(where $R_1$ has the same meaning as in the Formula 1) according to the following scheme of reactions

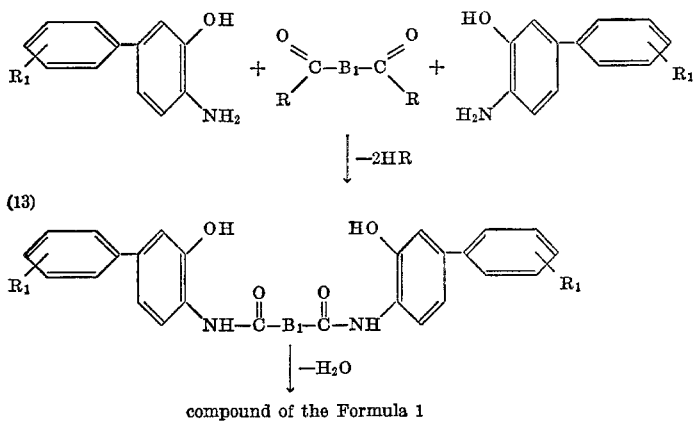

compound of the Formula 1

The reaction of the pairs of reactants 4 and 5, 8 and 9 and 11 and 12 can be carried out with or without intermediate isolation of the primarily formed acylamino compounds of the Formulas 6, 10 and 13 respectively, by heating at an elevated temperature, for example at 120 to 350° C., advantageously in an inert gas, for example nitrogen, and if desired in the presence of a catalyst. Suitable catalysts are, for example, boric acid, boric anhydride, zinc chloride, para-toluenesulphonic acid, also polyphosphoric acids including pyrophosphoric acid.

when boric acid is used at catalyst, it is advantageously used in an amount from 0.5 to 5% referred to the total weight of the reaction mass. It is also possible to use additionally high-boiling, polar, organic solvents such for example, as dimethylformamide, dichlorobenzene, trichlorobenzene or aliphatic (if desired etherified) hydroxy compounds, for example propyleneglycol, ethyleneglycol, monoethyl ether or diethyleneglycol diethyl ether and high-boiling esters of phthalic acid, for example dibutyl phthalate.

It is, however, preferable to perform the process in two stages by first condensing the carboxylic acid halides, especially carboxylic acid chlorides, of the Formulae 4, 8 and 11 with the ortho-amino compounds of the Formulae 5, 9 and 12 in an organic, inert solvent such as toluene, a xylene, chlorobenzene, dichlorobenzene, trichlorobenzene or nitrobenzene at a temperature from 100 to 200° C. and then converting the resulting acyl compounds of the Formulae 6, 10 and 13 into the azole derivatives optionally in the presence of a catalyst at 150 to 350° C.

When carboxylic acid chlorides are used as starting materials, they can be prepared immediately before the condensation with the ortho-amino compound and without isolating from the free carboxylic acid and thionylchloride, if required or desired in the presence of a catalyst such as pyridine, in the solvent in which subsequently the condensation is to be carried out.

As examples of new bisazoles of the Formula 1 or 2 accessible by the process described there may be mentioned the following:

(14)

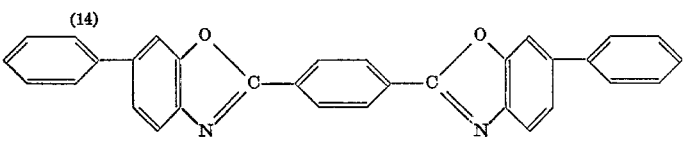

(15)

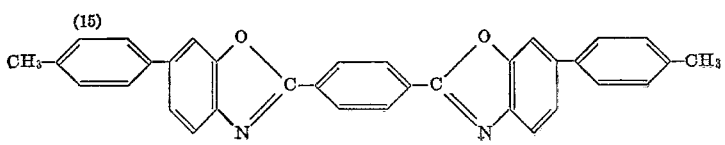

and

(16)
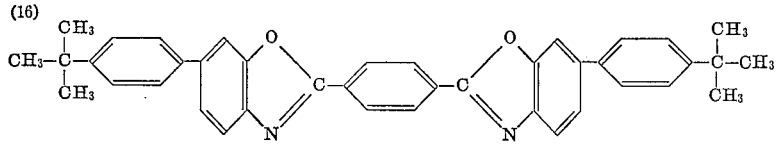

The bisazoles of the Formula 1 obtained by the process described lend themselves to further reactions. Thus, water-soluble derivatives are obtained when the bisazole of the Formula 1 is sulphonated, e.g. with sulphuric acid monohydrate, chlorosulphonic acid or with sulphuric acid containing sulphur trioxide, if desired at an elevated temperature, and the sulphonic acid group is then converted with an organic or preferably an inorganic base into the corresponding salts.

The new optical brighteners of the composition defined above display in the dissolved or finely dispersed state a more or less pronounced fluorescence. They may be used for optically brightening a wide variety of organic materials of high or low molecular weight or materials containing organic substances.

As relevant examples the following groups of organic materials suitable for optical brightening may be mentioned, without thereby in any way restricting the possible scope:

(I) Synthetic organic materials of high or low molecular weight;

(a) Polymers based on organic compounds containing at least one polymerizable carbon-to-carbon double bond, i.e. their homopolymers and copolymers and products obtained by after-treating them, such as cross-linked, grafted or decomposition products, polymer dilutions or the like; relevant examples are: polymers based on $\alpha,\beta$-unsaturated carboxylic acids, especially of acryl compounds (e.g. acrylic esters, acrylic acids, acrylonitrile, acrylamides and their derivatives or their methacrylic analogues), of olefinic hydrocarbons (e.g. ethylene, propylene, isobutylene, styrenes, dienes, especially butadiene, isoprene i.e. also rubbers and rubber-like polymers; furthermore so-called ABS-polymers), polymers based on vinyl and vinylidene compounds (e.g. vinyl esters, vinylchloride, vinylsulphonic acid, vinyl ethers, vinyl alcohol, vinylidenechloride, vinylcarbazole), of halogenated hydrocarbons (chloroprene, highly halogenated ethylenes), of unsaturated aldehydes and ketones (e.g. acrolein or the like), of allyl compounds or the like; graft polymerization products (e.g. by grafting vinylic monomers), cross-linked products (e.g. by means of bifunctional or polyfunctional cross-linking agents such as divinyl-benezene, polyfunctional allyl compounds or bisacryl compounds, or products accessible by partial decomposition (hydrolysis, depolymerization) or modification of reactive groupings (e.p. esterification, etherification, halogenation, self-crosslinking).

(b) Other polymers accessible, for example, by ring opening e.g. polyamides of the polycaprolactam type; furthermore formaldehyde polymers or polymers accessible by polyaddition as well as by polycondensation, such as polyethers, polythioethers, polyacetals and thioplasts.

(c) Polycondensation products or precondensates based on bifunctional or polyfunctional compounds containing condensable groups, their homo- and co-condensates and products obtained by after-treating them; relevant examples are: polyesters, saturated (e.g. polyethylene terephthalate) or unsaturated (e.g. maleic acid-dialcohol polycondensates and their cross-linked products with polymerizable vinyl monomers), linear or branched (also those based on polyhydric alcohols e.g. alkyd resins). Polyamides (e.g. hexamethylenediamine adipate) maleinate resins, melamine resins, phenolic resins (novolaks), aniline resins, furan resins, carbamide resins and their precondensates, and similarly constituted products, polycarbonates, silicone resins and others.

(d) Polyadducts such as polyurethanes (if desired cross-linked), epoxy resins.

(II) Semisynthetic organic materials e.g. celluloseesters or mixed esters (acetate, propionate, nitrocellulose, cellulose ethers), regenerated cellulose (viscose, cuprammonium cellulose) or products obtained by after-treating them, casein plastics.

(III) Natural organic materials of animals or vegetable origin, e.g. based on cellulose or proteins such as wool, cotton, silk, bast, jute, hemp, furs and hairs, leathers, finely dispersed wood masses, natural resins (such as colophony, especially lacquer resins). Furthermore rubber, gutta percha, balata and products obtained by after-treating or modifying them (e.g. by curing, cross-linking or grafting), decomposition products (e.g. by hydrolysis, depolymerization), products accessible by conversion of reactive groups (e.g. by acylation, halogenation, cross-linking or the like).

The organic materials that can be optically brightened may be at any stage of their processing (raw materials, semi-finished products or finished articles) and physical states. They may be in the form of structures of any desired shape, that is to say, for example, they may be predominantly three-dimensional bodies such as blocks, plates, sections, pipes, injection mouldings or components of any desired kind, chips or granulates, foamed articles; predominantly two-dimensional bodies such as films, foils, lacquers, tapes, coatings, impregnations or coatings; or predominantly unidimensional bodies such as filaments, fibres, flocks, bristles or wires. The said materials may also be as yet not shaped and be in the most varied homogeneous and inhomogeneous forms of dispersion and physical states, for example in the form of powders, solutions, emulsions, dispersions, latices (e.g. lacquer solutions, polymer dispersions), sols, gels, putties, pastes, waxes, adhesives, pore fillers or the like.

Fibrous materials may, for example, take the form of continuous filaments, staple fibres, flocks, hanks, textile threads, yarns, doubled yarns, fibre fleeces, felts, cotton-wool flocculated products or of textile farbics or textile laminates, knitwear, of papers, cardboards, paper pulps or the like.

The compounds to be used according to this invention are of special value for the treatment of textile organic materials, especially woven textile fabrics. If fibres—which may be staple fibres or continuous filaments, in the form of hanks, woven or knitted fabrics, fleeces, flocculated substrates or laminates—are to be optically brightened by the present process, this is advantageously done in an aqueous medium in which the chosen compound is finely dispersed (suspended or, if desired, dissolved). If desired, there may be added to the treatment liquor a dispersant, for example soaps, polyglycol ethers of fatty alcohols, fatty amines or alkylphenols, cellulose sulphite waste liquor or condensation products of (possibly alkylated) naphthalenesulphonic acids with formaldehyde. It has been found particularly advantageous to work in a neutral, weakly alkaline or acid bath. Likewise, it is advantageous to perform the treatment at a temperature from about 50 to 100° C., for example at the boiling temperature of the bath or in its vicinity (at about 90° C.). The improving treatment according to this invention may also be carried out with solutions in organic solvents.

Furthermore, the new optical brighteners to be used in this invention may be added to, or incorporated with, the materials before or during their shaping. Thus, for example, in the manufacture of films, foils, tapes or mouldings they may be added to the moulding or injection moulding composition or they may be dissolved, dispersed or in any other way finely distributed in the spinning mass before spinning. The optical brighteners may also be added to the starting materials, reaction mixtures or intermediate products used to produce fully synthetic or semi-synthetic organic materials, that is to say before or during the chemical reaction, e.g. a polycondensation (including the precondensates), a polymerization (including the prepolymers) or a polyaddition.

The new optical brighteners can, of course, also be used whenever organic materials of the kind indicated above are combined with inorganic materials in any desired form (typical examples: detergents, white pigments in organic substances).

The new optical brighteners are distinguished by their particularly good heat resistance and fastness to light and to migration.

The amount of the new optical brightener to be used according to this invention, referred to the weight of the material to be optically brightened, may vary within wide limits. Even very small amounts, in some cases for instance as little as 0.001% by weight, may suffice to produce a distinct and durable effect, though it is also possible to use amount of up to about 0.5% by weight or more. For most practical purposes an amount ranging from 0.01 to 0.2% by weight will be preferred.

The new compounds, to be used as brightening agents, may also be applied, for example, as follows:

(a) In admixture with dyestuffs or pigments or as additives to dyebaths, or printing, discharge or reserve pastes. Also for after-treating dyeings, prints or discharge prints.

(b) In admixture with so-called "carriers," antioxidants, light filters, heat stabilizers, chemical bleaches or as additives to bleaching baths.

(c) In admixture with cross-linking agents, dressings such as starch or synthetic dressings. It may be of advantage to add the products of this invention to the liquors used for producing an anti-crease finish.

(d) In combination with detergents. The detergent and the optical brightener may be added separately to the washing liquor. It is also advantageous to use detergents that as such already contain a share of brightening agent. Suitable detergents are e.g. soaps, salts of sulphonate washing agents e.g. of sulphonated benzimidazoles substituted on the carbon atom 2 by higher alkyl radicals, also salts of monocarboxylic acid esters of 4-sulphophthalic acid with higher fatty alcohols, also salts of fatty alcohol sulfphonates, alkylarylsulphonic acids or condensation products of higher fatty acids with aliphatic hydroxysulphonic or aminosulphonic acids. Furthermore, there may be used non-ionic detergents e.g. polyglycol ethers derived from ethylene oxide and higher fatty alcohols, alkylphenols or fatty amines.

(e) In combination with polymeric vehicles (polymers, polycondensates or polyadducts) in which the brightening agent, if desired in addition to other substances, is incorporated in the dissolved or dispersed form, for example in the case of coating, impregnating or binding agents (solutions, dipsersions, emulsions) for textile materials, fleeces, papers or leathers.

(f) As additives to a wide variety of industrial products to improve their presentation or to obviate disadvantages in their use, for example as additives to glues, adhesives, paints or the like.

The compounds of the above formulae can be used as scintillators for various photographic purposes, such as electrophotographic reproduction or for supersensitizing.

If the brightening operation is to be combined with other treating or improving operations, the combined treatment is advantageously performed with the use of a suitable stable preparation which contains in addition to optically brightening compounds the above general formula also dispersants, detergents, carriers, dyestuffs, pigments or dressing agents.

When treating a number of fibrous substrates, e.g. polyester fibres, with the brighteners of this invention it is advantageous to impregnate these fibres with an aqueous dispersion of the brightener at a temperature below 75° C., e.g. at room temperature, and then to subject them to a dry heat treatment at a temperature above 100° C. In general, it is of advantage first to dry the impregnated fibrous material at a moderately raised temperature, e.g. at a temperature from at least 60° C. to about 100° C. The heat treatment of the dry material is then advantageously carried out at 120 to 225° C., for example by heating in a drying chamber, by ironing within the indicated temperature range or by treatment with dry, superheated steam. If desired, the drying and the dry heat treatment may follow immediately upon each other or they may be performed in a single stage.

Unless otherwise indicated, parts and percentages in the following examples are by weight.

EXAMPLE 1

A mixture of 3.32 parts of terephthalic acid, 7.41 parts of 3-hydroxy-4-aminodiphenyl, 0.2 part of boric acid and 50 parts by volume of diethyleneglycol dibutyl ether is heated under nitrogen within 6 hours to 260° C., with the water formed and 20 parts by volume of solvent passing over. After cooling, washing with perchloroethylene and drying, there are obtained 7.80 parts of the compound of the formula (14)

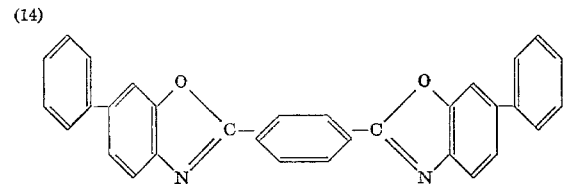

as greyish brown crystals melting at 335 to 339° C. After three recrystallizations from trichlorobenzene with the aid of bleaching earth and active carbon there are obtained light-yellow needles melting at 338 to 341° C.

Calcd. for $C_{32}H_{20}O_2N_2$ (percent): Mol.weight—464.50. C, 82.74; H, 4.34; N, 6.03. Found (percent): C, 82.51; H, 4.31; N, 5.93.

When terephthalic acid is replaced by an equivalent amount of diphenyl-4,4'-dicarboxylic acid, the compound of the formula (17)

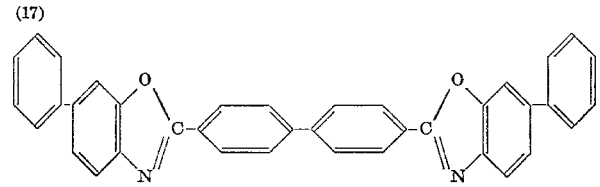

is obtained which, after recrystallization from dibutyl phthalate and sublimation above 300° C. in a high vacuum, forms pale-yellow crystals melting at 349 to 351° C.

Calcd. for $C_{38}H_{24}O_2N_2$ (percent): Mol. weight—540.59. C, 84.42; H, 4.48; N, 5.18. Found (percent): C, 84.51; H, 4.58; N, 5.30.

When 3-hydroxy-4-aminodiphenyl is replaced by an equivalent amount of 3-hydroxy-4-amino-4'-methyldiphenyl, and terephthalic acid is used, there is obtained in an analogous manner the compound of the formula (15)

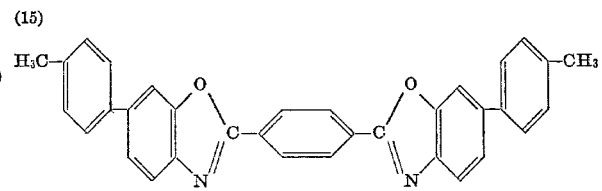

in the form of greenish light-yellow flakes melting at 324 to 326° C. (from trichlorobenzene).

Calcd. for $C_{34}H_{24}O_2N_2$ (percent): Mol. weight—492.55. C, 82.90; H, 4.91; N, 5.69. Found (percent): C, 82.56; H, 4.92; N, 5.65.

When 3 - hydroxy-4-aminodiphenyl is replaced by an equivalent amount of 3-hydroxy-4-amino-4'-tertiary butyl diphenyl, and terephthalic acid is used, there is obtained in an analogous manner the compound of the formula

(16)
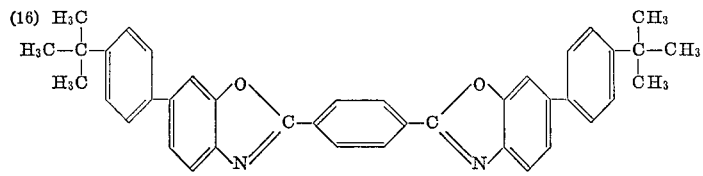

in the form of faintly yellowish needles melting at 368° C. (from perchloroethylene).

Calcd. for $C_{40}H_{36}O_2N_2$ (percent): Mol. weight—576.70. C, 83.30; H, 6.29; N, 4.86. Found (percent): C, 82.35; H, 6.31; N, 4.83.

An analogous reaction of 2,5-dimethyl-terephthalic acid and 3-hydroxy-4-aminodiphenyl furnishes the compound of the formula

(18)
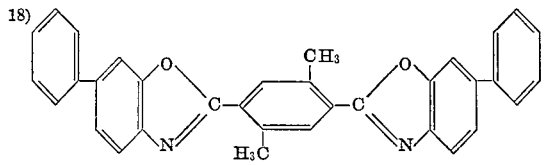

in the form of light greenish yellow crystals melting at 300 to 302° C. (from ortho-dichlorobenzene).

Calcd. for $C_{34}H_{24}O_2N_2$ (percent): Mol. weight—492.55. C, 82.90; H, 4.91; N, 5.69. Found (percent): C, 82.85; H, 5.02; N, 5.65.

EXAMPLE 2

A mixture of 1.10 parts of terephthalic acid dichloride, 1.85 parts of 3-hydroxy-4-aminodiphenyl, and 50 parts by volume of trichlorobenzene is heated under nitrogen within 2½ hours to 185° C. 0.1 part of boric anhydride and 50 parts by volume of dibutyl phthalate are added and the batch is heated to 335° C., with the trichlorobenzene, the water formed and part of the dibutyl phthalate passing over. After cooling, suctioning, washing with alcohol and drying, there is obtained compound of the formula

(19)
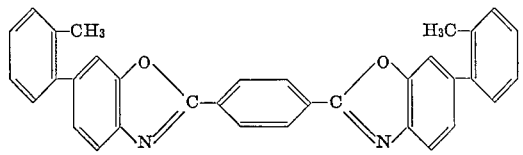

in the form of faintly yellowish, shiny crystals melting at 259 to 260° C. (from perchloroethylene).

Calcd. for $C_{34}H_{24}O_2N_2$ (percent): Mol. weight—492.55. C, 82.90; H, 4.91; N, 5.69. Found (percent): C, 82.77; H, 5.14; N, 576.

An analogous reaction of chloroterephthalic acid chloride with 3-hydroxy-4-aminodiphenyl furnishes the compound of the formula

(20)
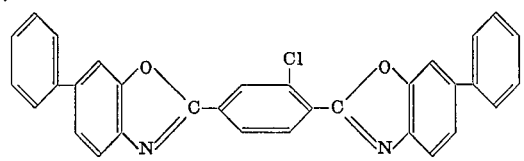

in the form of faintly greenish crystals melting at 242 to 244° C. (from ortho-dichlorobenzene).

Calcd. for $C_{32}H_{19}O_2N_2Cl$ (percent): mol. weight—498.97. C, 77.03; H, 3.84; O, 6.41; N, 5.61; Cl, 7.11. Found (percent): C, 76.25, H, 3.84; O, 6.21; N, 5.46; Cl, 8.13.

An analogous reaction of oxalylchloride with 3-hydroxy - 4-aminodiphenyl furnishes the compound of the formula

(21)
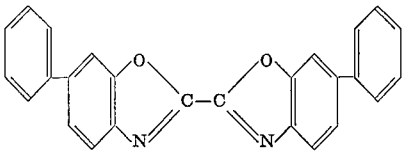

in the form of greenish yellow crystals melting at 278 to 280 ° C. (after sublimation in a high vacuum).

Calcd. for $C_{26}H_{16}O_2N_2$ (percent): Mol. weight—388.40. C, 80.40; H, 4.15; N, 7.21. Found (percent): C, 80.46; H, 4.14; N, 7.22.

EXAMPLE 3

A mixture of 3.4 parts of tetrachloroterephthalic acid dichloride, 3.7 parts of 3-hydroxy-4-aminodiphenyl and 25 parts by volume of anhydrous trichlorobenzene is heated; between 150 and 160° C. evolution of hydrogen chloride sets in and a thick suspension forms of the open amide of the formula

(22)
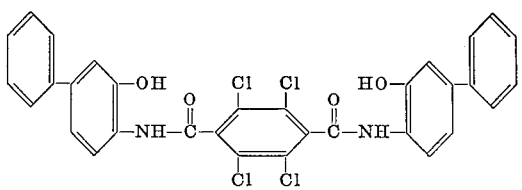

A specimen of this product, recrystallized from nitrobenzene, melts above 360° C. and reveals the following analytical data:

Calcd. for $C_{32}H_{20}O_4N_2Cl_4$ (percent): Mol. weight—638.33. C, 60.21; H, 3.39; N, 4.39; Cl, 22.20. Found (percent): C, 60.32; H, 3.19; N, 4.37; Cl, 22.18.

To perform cyclization the suspension is heated in a sol bath while distilling off the solvent. At 400 to 404° C. the mass melts and the water formed passes over. The batch is allowed to cool and then recrystallized from dimethylformamide, to yield the compound of the formula

(23)
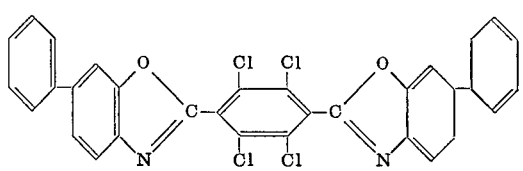

in the form of substantially colourless crystals melting at 282 to 284° C.

Calcd. for $C_{32}H_{16}O_2N_2Cl_4$ (percent): Mol. weight—602.30. C, 63.81; H, 2.68; N, 4.65; Cl, 23.54. Found (percent): C, 64.00; H, 2.85; N, 4.56; Cl, 23.49.

EXAMPLE 4

A mixture of 3.82 parts of the compound of the formula

(24)
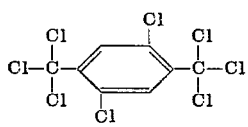

3.70 parts of 3-hydroxy-4-aminodiphenyl and 50 parts by volume of ortho-dichlorobenzene is stirred for 2 hours under reflux, during which hydrogen chloride escapes. 20 parts by volume of trichlorobenzene are then added and the mixture is heated to 214° C., with most of the solvent passing over. After purification on active alumina and recrystallization from perchloroethylene, there are obtained 1.6 parts of the compound of the formula

(25)
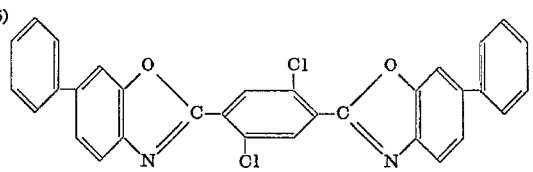

in the form of greenish crystals melting at 290 to 292° C.

Calcd. for $C_{32}H_{18}O_2N_2Cl_2$ (percent): Mol. weight—533.41. C, 72.06; H, 3.40; N, 5.25; Cl, 13.29. Found (percent): C, 71.35; H, 3.60; N, 5.15; Cl, 13.90.

EXAMPLE 5

A mixture of 0.7 part of the acid chloride of the formula

(26)
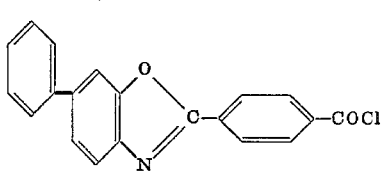

0.4 part of 3-hydroxy-4-amino-4'-methyldiphenyl and 10 parts by volume of trichlorobenzene is heated within 2 hours to the reflux temperature, then 0.02 part of boric anhydride is added and the batch is stirred for 2 hours, with 5 parts by volume of trichlorobenzene and the water formed passing over. After cooling, suctioning, washing with methanol and drying, there is obtained 0.5 part of the compound of the formula

(27)
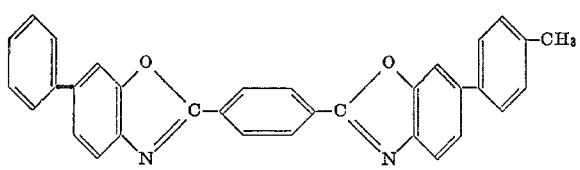

in the form of beige-coloured crystals melting at 299 to 304° C. Recrystallization from ortho-dichlorobenzene furnishes yellowish crystals melting at 302 to 305° C.

Calcd. for $C_{33}H_{22}O_2N_2$ (percent): Mol. weight—478.52. C, 82.82; H, 4.63; N, 5.85. Found (percent): C, 82.51; H, 4.72; N, 5.79.

The acid chloride used as starting material can be prepared from terephthalic acid methyl ester chloride and 3-hydroxy 4-aminodiphenyl via the following reaction stages:

(28)
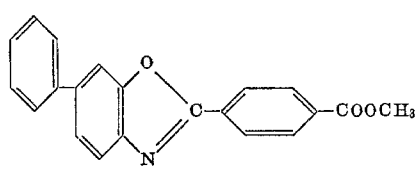

colourless crystals from ortho-dichlorobenzene, melting at 224 to 225° C.

Calcd. for $C_{21}H_{15}O_3N$ (percent): Mol. weight—329.34. C, 76.58; H, 4.59; N, 4.25. Found (percent): C, 76.28; H, 4.53; N, 4.27.

(29)
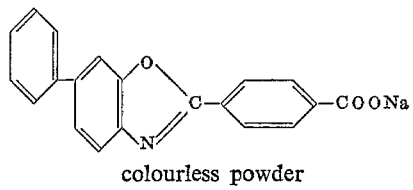

colourless powder

(30)
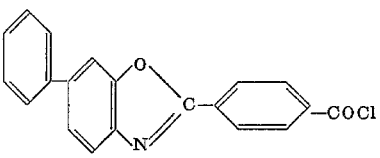

colourless crystals from perchloroethylene melting at 199 to 201° C.

EXAMPLE 6

A polyester (e.g. Dacron) fabric is padded at room temperature with an aqueous dispersion containing per litre 2 g. of the compound of the Formula 20 or 25 and 1 g. of an adduct from about 8 mols of ethylene oxide with 1 mol of para-tertiary octylphenol, and then dried at about 100° C. The dry material is then subjected to a heat treatment at 150 to 220° C. lasting for 2 minutes to a few seconds according to the temperature used. The material treated in this manner has a substantially whiter aspect than the untreated material.

EXAMPLE 7

100 parts of a polyester granulate from polytetraphthallic acid ethyleneglycol ester are intimately mixed with 0.05 part of the compound of the Formula 14 or 16 and melted at 285° C. with stirring. When the spinning mass is spun through usual spinnerets, strongly brightened polyester fibres are obtained. If desired, the compound of the Formula 14 or 16 may alternatively be added to the starting materials before proceeding to the polycondensation leading to the polyester.

EXAMPLE 8

10,000 parts of a polyamide in chip form, prepared in known manner from hexamethylenediamineadipate are mixed for 12 hours in a tumbler with 30 parts of titanium dioxide (rutile modification) and 10 parts of the compound of the Formula 14 or 15. The chips treated in this manner are then melted in a boiler from which the atmospheric oxygen has been displaced with superheated steam and which is heated to 300 to 310° C. with oil or with diphenyl vapour, and the melt is stirred for half an hour, then expressed through a spinneret under a nitrogen pressure of 5 atmospheres (gauge), and the resulting, cooled filament is reeled on a cheese. The filament obtained in this manner displays a brightening effect which is fast to heat-setting and has good fastness to washing and light.

EXAMPLE 9

10,000 parts of a polyamide in chip form, prepared in known manner from ε-caprolactam, are mixed for 12 hours in a tumbler with 30 parts of titanium dioxide (rutile modification) and 2 parts of the compound of the Formula 14). The chips treated in this manner are melted in a boiler from which the atmospheric oxygen has been displaced and which is heated at 270° C., and the melt is stirred for half an hour, then expressed through a spinneret under a nitrogen pressure of 5 atmospheres (gauge), and the cooled filament is reeled on a cheese. The resulting filament reveals a brightening effect of excellent fastness to heat-setting and good fasteness to washing and light.

EXAMPLE 10

100 parts of polypropylene (fibre grade) are intimately mixed with 0.02 part of the compound of the Formula 14 and melted at 280 to 290° C. while being stirred. When this melt is spun through conventional spinnerets and stretched, there are obtained polypropylene fibres which have an excellent brightening effect which is fast to light.

What is claimed is:

1. Bisbenzoxazoles of the formula

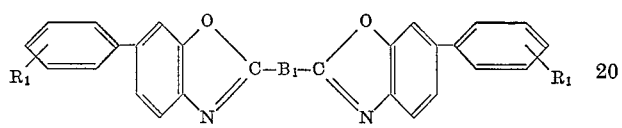

where each of the residues $R_1$ represents a member selected fro mthe group consisting of a hydrogen atom and an alkyl group containing 1 to 6 carbon atoms, and $B_1$ represents a bivalent bridge member selected from the group consisting of the formulae

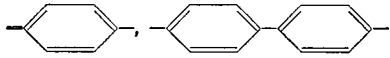

and a direct bond between the $C_2$ carbon atoms of the benzoxazolyl nuclei, and the phenylene nuclei of the said bridge members may contain as substituents members selected from the group consisting of 1 to 2 lower alkyl groups containing 1 to 4 carbon atoms and 1 to 4 halogen atoms.

2. Bisbenzoxazoles of the formula

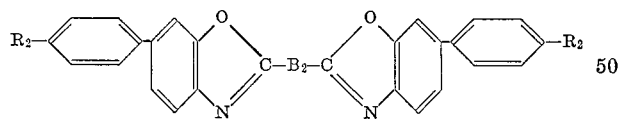

where the residues $R_2$ are identical and each represents a member selected from the group consisting of a hydrogen atom, a methyl and a tertiary butyl group, and $B_2$ stands for a 1,4-phenylene residue, said phenylene residue containing up to 2 members selected from the group consisting of a halogen atom and a methyl group.

3. The compound of the formula

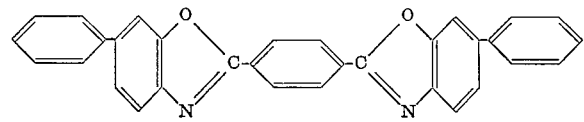

4. The compound of the formula

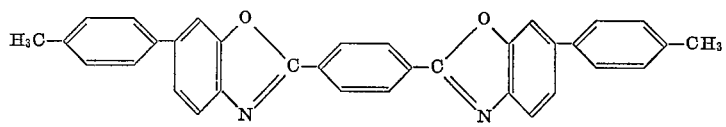

5. The compound of the formula

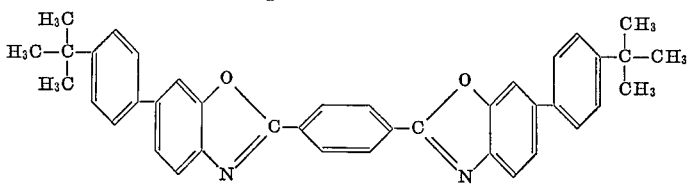

6. The compound of the formula

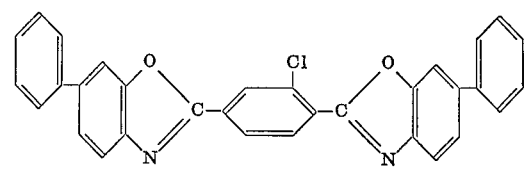

7. The compound of the formula

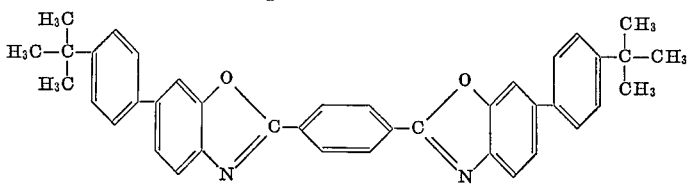

8. The compound of the formula

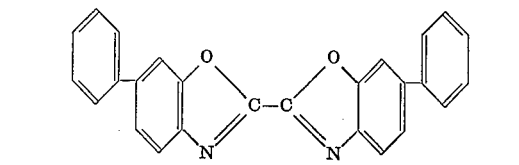

References Cited

UNITED STATES PATENTS

| | | | |
|---|---|---|---|
| 3,250,780 | 5/1966 | Rai et al. | 260—307 |
| 3,314,894 | 4/1967 | Nyilas et al. | 260—307 |
| 3,336,330 | 8/1967 | Schinzel et al. | 260—307 |

ALTON D. ROLLINS, Primary Examiner

U.S. Cl. X.R.

8—1, 76; 96—1.6; 117—33.5; 252—117, 152, 301.2; 260—471, 559, 571